(12) United States Patent
Li et al.

(10) Patent No.: US 12,107,661 B2
(45) Date of Patent: Oct. 1, 2024

(54) CONTROL METHOD FOR SMART REPEATERS

(71) Applicant: QUALCOMM Incorporated, San Diego, CA (US)

(72) Inventors: Junyi Li, Chester, NJ (US); Ashwin Sampath, Skillman, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/945,507

(22) Filed: Jul. 31, 2020

(65) Prior Publication Data

US 2021/0036764 A1 Feb. 4, 2021

Related U.S. Application Data

(60) Provisional application No. 62/881,823, filed on Aug. 1, 2019.

(51) Int. Cl.
*H04B 7/155* (2006.01)
*H04W 16/28* (2009.01)

(52) U.S. Cl.
CPC ........ *H04B 7/15528* (2013.01); *H04W 16/28* (2013.01)

(58) Field of Classification Search
CPC ............... H04B 7/15528; H04B 7/088; H04B 7/0695; H04W 16/28; H04L 5/0048; H04L 5/001; H04L 5/0094
See application file for complete search history.

(56) References Cited

U.S. PATENT DOCUMENTS

| 8,750,196 | B2 | 6/2014 | Chen et al. | |
| 10,433,342 | B2 | 10/2019 | Akkarakaran et al. | |
| 10,785,705 | B1 | 9/2020 | Rofougaran et al. | |
| 11,071,155 | B2 | 7/2021 | Baghel et al. | |
| 11,310,771 | B2 | 4/2022 | Harada et al. | |
| 2009/0287979 | A1* | 11/2009 | Wang | H04L 1/0059 714/752 |
| 2010/0150103 | A1 | 6/2010 | Womack et al. | |
| 2010/0167768 | A1* | 7/2010 | Tsutsui | H04B 7/15542 455/500 |
| 2010/0254295 | A1* | 10/2010 | Ahn | H04N 21/6405 370/312 |

(Continued)

FOREIGN PATENT DOCUMENTS

CN 109996332 A 7/2019
CN 109996333 A 7/2019
(Continued)

OTHER PUBLICATIONS

International Search Report and Written Opinion—PCT/US2020/044681—ISA/EPO—dated Oct. 22, 2020.

*Primary Examiner* — Tejis Daya
(74) *Attorney, Agent, or Firm* — Patterson+ Sheridan, L.L.P.

(57) ABSTRACT

Aspects of the present disclosure provide apparatus, methods, processing systems, and computer readable mediums to enhance the functionality of directional repeaters (wireless devices that relay directional wireless signals). For example, by adding even limited capability to buffer digital samples, repeater functionality may be enhanced to provide better coverage and make more efficient use of time, frequency, and spatial resources.

12 Claims, 13 Drawing Sheets

(56) References Cited

U.S. PATENT DOCUMENTS

| | | | |
|---|---|---|---|
| 2010/0302998 A1 | 12/2010 | Bao et al. | |
| 2010/0329216 A1 | 12/2010 | Jen | |
| 2011/0110258 A1 | 5/2011 | Ishii et al. | |
| 2011/0136525 A1* | 6/2011 | Fujii | H04B 7/15592 455/507 |
| 2011/0194483 A1 | 8/2011 | Ji et al. | |
| 2012/0039299 A1* | 2/2012 | Teyeb | H04W 36/12 370/331 |
| 2012/0213137 A1* | 8/2012 | Jeong | H04W 72/1289 370/311 |
| 2012/0307717 A1 | 12/2012 | Worrall et al. | |
| 2013/0016649 A1 | 1/2013 | Damnjanovic et al. | |
| 2013/0142107 A1 | 6/2013 | Ohta et al. | |
| 2013/0223251 A1* | 8/2013 | Li | H04B 7/0619 370/252 |
| 2013/0286965 A1 | 10/2013 | Xu et al. | |
| 2014/0126460 A1 | 5/2014 | Bienas et al. | |
| 2016/0183208 A1 | 6/2016 | Lee et al. | |
| 2017/0164381 A1 | 6/2017 | Kim et al. | |
| 2017/0359766 A1 | 12/2017 | Agiwal et al. | |
| 2018/0092139 A1 | 3/2018 | Novlan et al. | |
| 2018/0092150 A1 | 3/2018 | Tenny et al. | |
| 2018/0110075 A1 | 4/2018 | Ly et al. | |
| 2018/0115990 A1 | 4/2018 | Abedini et al. | |
| 2018/0220356 A1 | 8/2018 | Tenny et al. | |
| 2018/0279380 A1 | 9/2018 | Jung et al. | |
| 2019/0007124 A1 | 1/2019 | Seo et al. | |
| 2019/0053272 A1 | 2/2019 | Tsai | |
| 2019/0124696 A1 | 4/2019 | Islam et al. | |
| 2019/0132882 A1 | 5/2019 | Li et al. | |
| 2019/0140881 A1* | 5/2019 | Akkarakaran | H04L 5/0048 |
| 2019/0215759 A1 | 7/2019 | Wei et al. | |
| 2019/0215869 A1* | 7/2019 | Lin | H04W 74/02 |
| 2019/0222290 A1 | 7/2019 | Ly et al. | |
| 2019/0260459 A1 | 8/2019 | Jeon et al. | |
| 2019/0327764 A1 | 10/2019 | Yoo et al. | |
| 2019/0349060 A1* | 11/2019 | Liao | H04W 76/27 |
| 2020/0059292 A1 | 2/2020 | Kim et al. | |
| 2020/0106582 A1 | 4/2020 | Jalali | |
| 2020/0107362 A1 | 4/2020 | Qi et al. | |
| 2020/0145860 A1* | 5/2020 | Koskela | H04W 76/14 |
| 2020/0196225 A1 | 6/2020 | Wang et al. | |
| 2020/0196383 A1* | 6/2020 | Tsai | H04L 5/0092 |
| 2020/0274609 A1 | 8/2020 | Youtz et al. | |
| 2020/0287605 A1* | 9/2020 | Mizusawa | H04L 27/26 |
| 2020/0288535 A1 | 9/2020 | Sharma et al. | |
| 2020/0304255 A1 | 9/2020 | Wu et al. | |
| 2020/0322919 A1* | 10/2020 | Wu | H04W 68/005 |
| 2020/0337115 A1 | 10/2020 | Qin et al. | |
| 2020/0367146 A1* | 11/2020 | Sharma | H04W 48/10 |
| 2020/0403689 A1* | 12/2020 | Rofougaran | H04W 52/245 |
| 2020/0412519 A1 | 12/2020 | Krishnaswamy et al. | |
| 2021/0036762 A1 | 2/2021 | Abedini et al. | |
| 2021/0037486 A1* | 2/2021 | Li | H04W 24/08 |
| 2021/0037601 A1 | 2/2021 | Xu et al. | |
| 2021/0075474 A1* | 3/2021 | Raghavan | H04B 7/0417 |
| 2021/0112598 A1 | 4/2021 | Ryu et al. | |
| 2021/0168880 A1 | 6/2021 | Ohara et al. | |
| 2021/0185723 A1 | 6/2021 | Abedini et al. | |
| 2021/0242916 A1 | 8/2021 | Lomayev et al. | |
| 2021/0298069 A1 | 9/2021 | Abedini et al. | |
| 2022/0070809 A1 | 3/2022 | Song et al. | |
| 2022/0104153 A1 | 3/2022 | Ko et al. | |
| 2022/0132576 A1 | 4/2022 | Maeder et al. | |
| 2022/0247474 A1 | 8/2022 | Rune et al. | |
| 2022/0248305 A1 | 8/2022 | Rofougaran et al. | |
| 2023/0100704 A1* | 3/2023 | Raghavan | H04W 56/0045 370/328 |
| 2023/0362984 A1 | 11/2023 | Abedini et al. | |

FOREIGN PATENT DOCUMENTS

| | | | |
|---|---|---|---|
| EP | 3451725 A1 | 3/2019 | |
| EP | 3720204 A1 | 10/2020 | |
| WO | WO-2017052569 A1 * | 3/2017 | H04B 7/2606 |
| WO | 2017127159 A1 | 7/2017 | |
| WO | WO-2017169199 A1 * | 10/2017 | H04B 17/318 |
| WO | 2018075256 | 4/2018 | |
| WO | WO-2018075534 A1 | 4/2018 | |
| WO | 2019134615 A1 | 7/2019 | |
| WO | 2019134617 A1 | 7/2019 | |
| WO | WO-2019194574 A1 * | 10/2019 | |

\* cited by examiner

CONTROL METHOD FOR SMART REPEATERS

PRIORITY CLAIM(S)

This application claims priority to and the benefit of U.S. Provisional Application No. 62/881,823, filed on Aug. 1, 2019, which is expressly incorporated by reference in its entirety as if fully set forth below and for all applicable purposes.

BACKGROUND

Field of the Disclosure

Aspects of the present disclosure relate to wireless communications, and more particularly, to techniques for providing control information for repeating directional wireless transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communication in integrated access and backhaul systems.

Certain aspects provide a method for wireless communications by a first wireless device. The method generally includes receiving, from a second wireless device, a first radio frequency (RF) signal of a first bandwidth, extracting control information from the first RF signal within the first bandwidth, selecting, based on the control information, at least one of one or more receive beams or one or more transmit beams, and using the selected beams to at least one of receive or forward a second RF signal of the first bandwidth between a second wireless device and a third wireless device.

Certain aspects of the present disclosure provide an apparatus for wireless communications by a first wireless device. The apparatus generally includes at least one processor and a memory configured to receive, from a second wireless device, a first radio frequency (RF) signal of a first bandwidth, extract control information from the first RF signal of the first bandwidth, select, based on the control information, at least one of one or more receive beams or one or more transmit beams, and use the one or more selected beams to at least one of receive a second RF signal from the second wireless device or forward the second RF signal to a third wireless device.

Certain aspects provide an apparatus for wireless communications by a first wireless device. The apparatus generally includes means for receiving, from a second wireless device, a first radio frequency (RF) signal of a first bandwidth, means for extracting control information from the first RF signal of the first bandwidth, means for selecting, based on the control information, at least one of one or more receive beams or one or more transmit beams, and means for using the one or more selected beams to at least one of receive a second RF signal from the second wireless device or forward the second RF signal to a third wireless device.

Certain aspects of the present disclosure provide a computer readable medium having instructions stored thereon for receiving, by a first wireless device from a second wireless device, a first radio frequency (RF) signal of a first bandwidth, extracting control information from the first RF signal within the first bandwidth, selecting, based on the control information, at least one of one or more receive beams or one or more transmit beams, and using the selected beams to at least one of receive or forward a second RF signal of the first bandwidth between the second wireless device and a third wireless device.

Certain aspects provide a method for wireless communications by a second wireless device. The method generally includes transmitting, to a first wireless device, a first radio frequency (RF) signal of a first bandwidth, and including, in the first bandwidth of the first RF signal, control information indicating at least one of one or more receive beams or one or more transmit beams for the first wireless device to use to at least one of receive a second RF signal from the second wireless device or forward the second RF signal to a third wireless device.

Certain aspects of the present disclosure provide an apparatus for wireless communications by a second wireless device. The apparatus generally includes at least one processor and a memory configured to transmit, to a first wireless device, a first radio frequency (RF) signal of a first bandwidth, and include, in the first bandwidth of the first RF signal, control information indicating at least one of one or more receive beams or one or more transmit beams for the first wireless device to use to at least one of receive a second RF signal from the second wireless device or forward the second RF signal to a third wireless device.

Certain aspects provide an apparatus for wireless communications by a second wireless device. The apparatus generally includes means for transmitting, to a first wireless device, a first radio frequency (RF) signal of a first bandwidth, and means for including, in the first bandwidth of the first RF signal, control information indicating at least one of one or more receive beams or one or more transmit beams for the first wireless device to use to at least one of receive a second RF signal from the second wireless device or forward the second RF signal to a third wireless device.

Certain aspects of the present disclosure provide a computer readable medium having instructions stored thereon for transmitting, by a second wireless device to a first wireless device, a first radio frequency (RF) signal of a first bandwidth, and including, in the first bandwidth of the first RF signal, control information indicating at least one of one or more receive beams or one or more transmit beams for the first wireless device to use to at least one of receive a second RF signal from the second wireless device or forward the second RF signal to a third wireless device.

To the accomplishment of the foregoing and related ends, the one or more aspects including the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
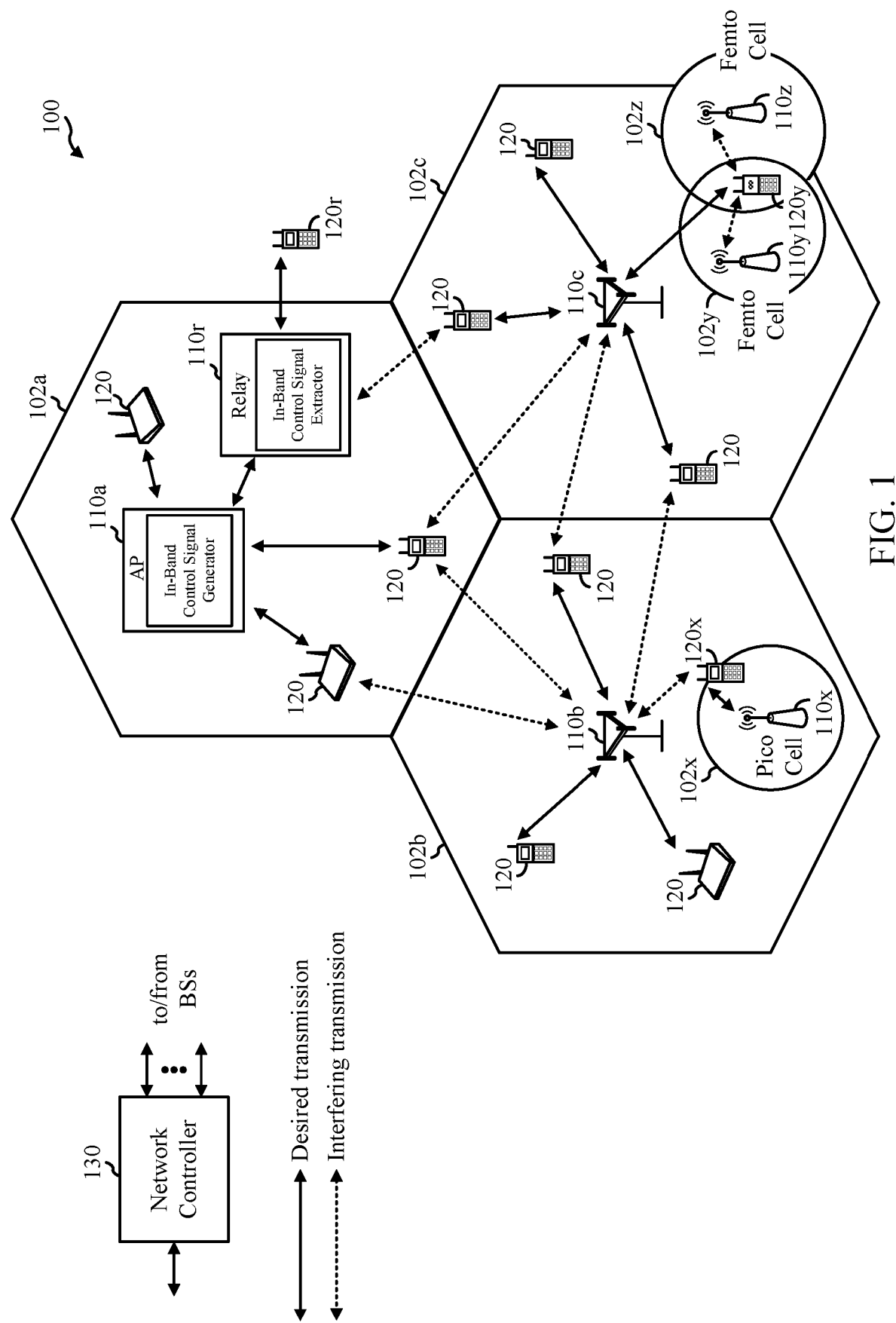
FIG. 1 is a block diagram conceptually illustrating an example wireless system, in accordance with certain aspects of the present disclosure.

Aspects of the present disclosure provide apparatus, methods, processing systems, and computer readable mediums to enhance the functionality of directional repeaters (wireless devices that relay directional wireless signals). As described in greater detail below, a network entity may provide control information to a smart repeater using a narrowband portion, such as a bandwidth part (BWP) of a wider band used to send an RF signal to be relayed by the smart repeater.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), an IAB node (e.g., an IAB donor node, an IAB parent node, and an IAB child node), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem (such as an AR/VR console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates an example wireless communication network 100 in which aspects of the present disclosure may be performed. For example, as shown in FIG. 1, a base station 110a may include an in-band control signal generator, designed to provide in-band control information to a repeater 110r within a narrowband portion of a wider band RF signal. As illustrated, the repeater 110r may include an in-band control signal extractor to extract the control information from the narrowband portion of the wider band RF signal.

The wireless communication network 100 may, for example, be a New Radio or 5G network. As illustrated in FIG. 1, the wireless communication network 100 may include a number of access points (APs) 110 and other network entities. An AP may be a station that communicates with user equipment (UEs). Each AP 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR AP, 5G NB, or transmission reception point (TRP) may be interchangeable. In some examples, a cell may not necessarily be stationary, and the geographic area of the cell may move according to the location of a mobile AP. In some examples, the access points may be interconnected to one another and/or to one or more other access points or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

An AP may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). An AP for a macro cell may be referred to as a macro AP. An AP for a pico cell may be referred to as a pico AP. An AP for a femto cell may be referred to as a femto AP or a home AP. In the example shown in FIG. 1, the APs 110*a*, 110*b* and 110*c* may be macro APs for the macro cells 102*a*, 102*b* and 102*c*, respectively. The AP 110*x* may be a pico AP for a pico cell 102*x*. The APs 110*y* and 110*z* may be femto APs for the femto cells 102*y* and 102*z*, respectively. An AP may support one or multiple (e.g., three) cells.

Wireless communication network 100 may also include relay stations. A relay station is a station that receives a transmission of data and/or other information from an upstream station (e.g., an AP or a UE) and sends a transmission of the data and/or other information to a downstream station (e.g., a UE or an AP). A relay station may also be a UE that relays transmissions for other UEs. In the example shown in FIG. 1, a relay station 110*r* may communicate with the AP 110*a* and a UE 120*r* in order to facilitate communication between the AP 110*a* and the UE 120*r*. A relay station may also be referred to as an IAB node, a relay AP, a relay, etc.

Wireless communication network 100 may be a heterogeneous network that includes APs of different types, e.g., macro AP, pico AP, femto AP, relays, etc. These different types of APs may have different transmit power levels, different coverage areas, and different impact on interference in the wireless communication network 100. For example, macro AP may have a high transmit power level (e.g., 20 Watts) whereas pico AP, femto AP, and relays may have a lower transmit power level (e.g., 1 Watt).

Wireless communication network 100 may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for both synchronous and asynchronous operation.

A network controller 130 may couple to a set of APs and provide coordination and control for these APs. The network controller 130 may communicate with the APs 110 via a backhaul. The APs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with an AP, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., an AP) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Access points are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving AP, which is an AP designated to serve the UE on the downlink and/or uplink. A finely dashed line with double arrows indicates interfering transmissions between a UE and an AP.

Figure 2:
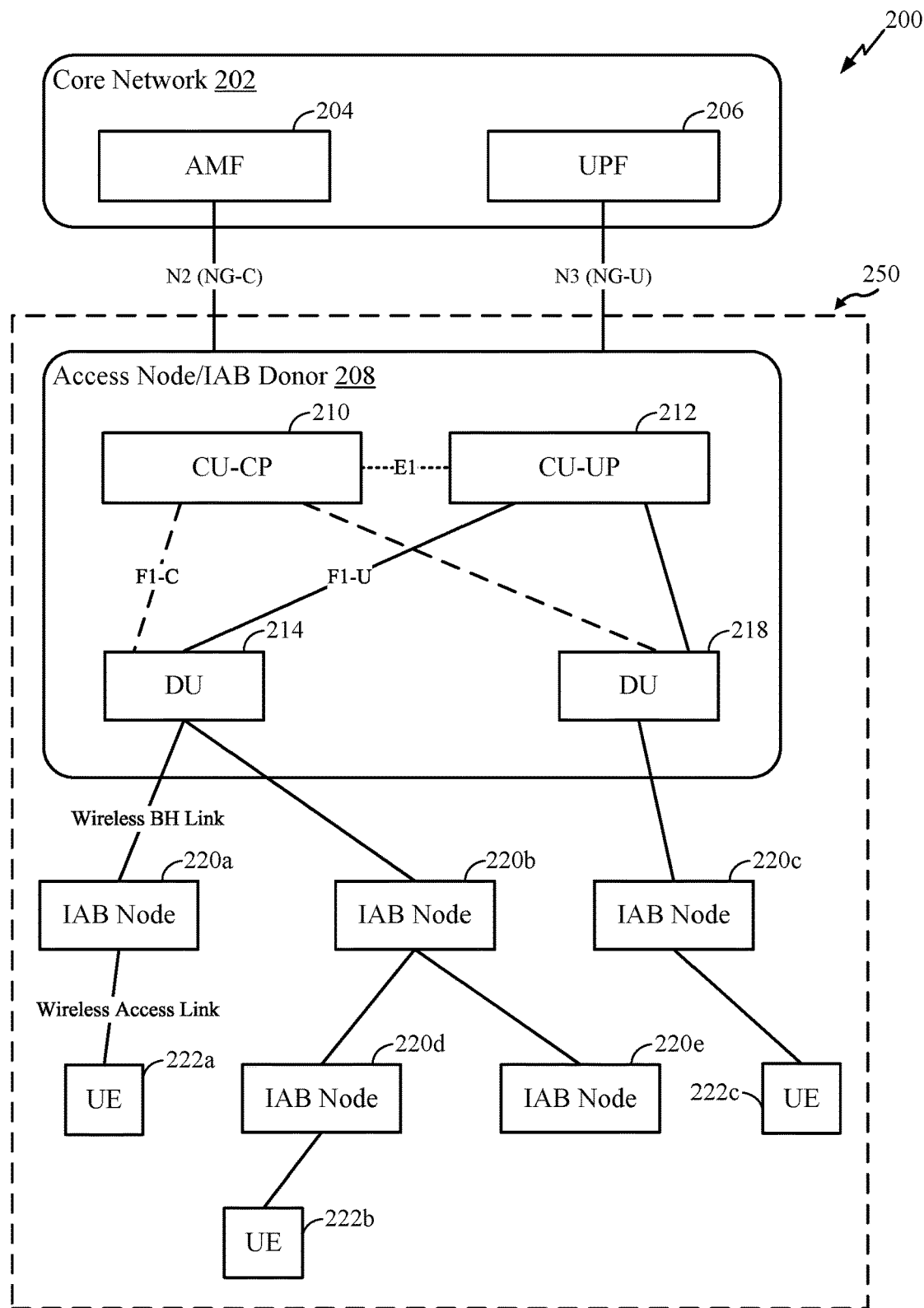
FIG. 2 is a block diagram conceptually illustrating an example architecture of a distributed radio access network (RAN), in accordance with certain aspects of the present disclosure.

FIG. 2 illustrates an example architecture of a distributed radio access network (RAN) 200 that includes an example IAB network 250, which may be implemented in the wireless communication network 100 illustrated in FIG. 1. As shown in FIG. 2, the distributed RAN includes core network (CN) 202 and access node (AN) configured as an IAB donor 208.

As shown, the IAB network 250 includes an IAB donor node 208. The IAB donor node 208 is a RAN node (e.g., access point/gNB that terminates the NR Ng interface with the core network (e.g., next generation NG core)) and is generally connected to the core network via a wireline backhaul link. The CN 202 may host core network functions. CN 202 may be centrally deployed. CN 202 functionality may be offloaded (e.g., to advanced wireless services (AWS)), in an effort to handle peak capacity. The CN 202 may include the access and mobility management function (AMF) 204 and user plane function (UPF) 206. The AMF 204 and UPF 206 may perform one or more of the core network functions.

The IAB donor 208 may communicate with the CN 202 (e.g., via a backhaul interface). The IAB donor 208 may communicate with the AMF 204 via an N2 (e.g., NG-C) interface. The IAB donor 208 may communicate with the UPF 206 via an N3 (e.g., NG-U) interface. The IAB donor 208 may include a central unit-control plane (CU-CP) 210, one or more central unit-user plane (CU-UPs) 212, one or more distributed units (DUs) 214-218, and one or more antenna/remote radio units (AU/RRUs) (not shown). The CUs and DUs may also be referred to as gNB-CU and gNB-DU, respectively.

An IAB donor node 208 may also be referred to as an IAB anchor node and may include an IAB central unit (e.g., NR CU) or an IAB Distributed Unit (e.g., NR DU). The IAB network 250 further includes one or more non-donor IAB nodes (e.g., 220a-220e). Each IAB node (including donor and non-donor IAB nodes) may serve one or more UEs (e.g., 222a-222c) connected to an IAB node. As shown, the IAB nodes, including the donor IAB node 208, may be connected via wireless backhaul links (e.g., NR wireless backhaul links or backup NR wireless backhaul links). Each IAB node connects to its served UEs via respective access links.

Each IAB node is a RAN node (e.g., access point/gNB) that provides IAB functionality with two roles including data unit function (DU-F) and a mobile termination function (MT-F). The DU-F of an IAB node is generally responsible for scheduling UEs (e.g., served by the IAB node) and other IAB nodes (e.g., that are connected as child nodes to the IAB node). The DU-F also controls both access and backhaul links under its coverage. The MT-F of an IAB node is controlled and scheduled by an IAB donor node or another IAB node as its parent IAB node. In an aspect, the IAB donor node 208 only includes DU-F and no MT-F.

The CU-CP 210 may be connected to one or more of the DUs 214-218. The CU-CP 210 and DUs 214-218 may be connected via a wireline interface using F1-C protocols. As shown in FIG. 2, the CU-CP 210 may be connected to multiple DUs, but the DUs may be connected to only one CU-CP. Although FIG. 2 only illustrates one CU-UP 212, the IAB donor 208 may include multiple CU-UPs. The CU-CP 210 selects the appropriate CU-UP(s) for requested services (e.g., for a UE). The CU-UP(s) 212 may be connected to the CU-CP 210. For example, the CU-UP(s) 212 and the CU-CP 210 may be connected via an E1 interface. The CU-CP(s) 212 may be connected to one or more of the DUs 214, 218. The CU-UP(s) 212 and DUs 214, 218 may be connected via a F1-U interface. As shown in FIG. 2, the CU-CP 210 may be connected to multiple CU-UPs, but the CU-UPs may be connected to only one CU-CP.

A DU, such as DUs 214 and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214, 218 may be connected with one of AU/RRUs.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, IAB donor 208 may support dual connectivity with NR and may share a common fronthaul for LTE and NR. The distributed RAN 200 may enable cooperation between and among DUs 214, 218, for example, via the CU-CP 212. An inter-DU interface may not be used.

Logical functions may be dynamically distributed in the distributed RAN 200. As will be described in more detail with reference to FIG. 4, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
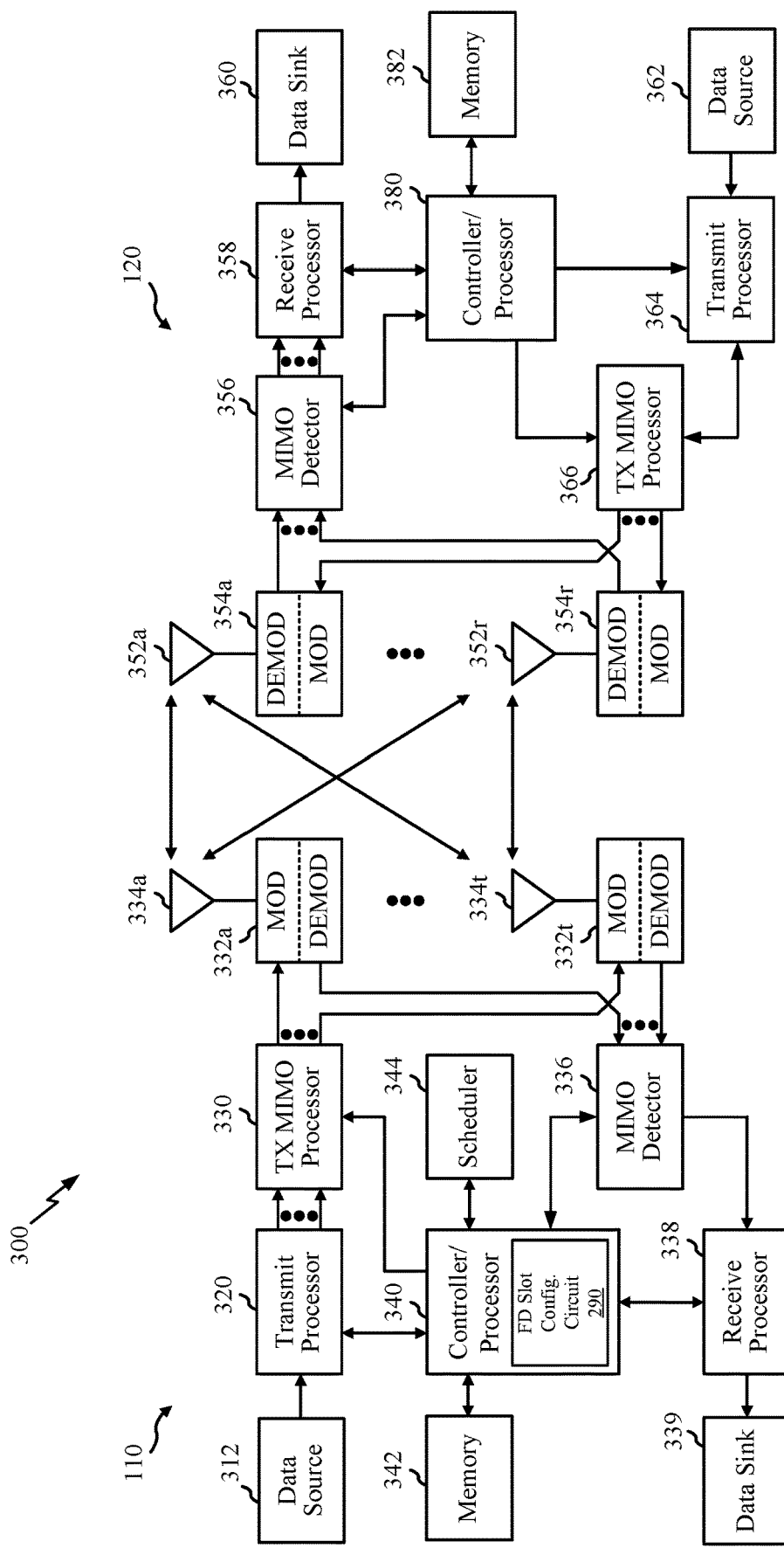
FIG. 3 illustrates example components of a base station and a user equipment, in accordance with certain aspects of the present disclosure.

FIG. 3 illustrates example components 300 of AP 110 and UE 120 (as depicted in FIG. 1), which may be used to implement aspects of the present disclosure. For example, antennas 352, processors 366, 358, 364, and/or controller/processor 380 of the UE 120 and/or antennas 334, processors 320, 330, 338, and/or controller/processor 340 of the AP 110 may be used to perform the various techniques and methods described herein. For example, as shown in FIG. 3, the processor 340 includes an full-duplex (FD) slot configuration circuit 290 that may be configured for full-duplex slot configuration in integrated access and backhaul (IAB) communication systems, according to aspects described herein. In certain aspects, the full-duplex slot communication circuit 290 enables the processor 340 to detect a change in the one or more traffic parameters, and dynamically modify a slot pattern based on the change in the one or more traffic parameters. In certain aspects, the AP 110 may be an IAB donor and/or parent node, or an IAB child node.

At the AP 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the access point 110 and may provide received signals to the demodulators (DEMODs) in transceivers 354a through 354r, respectively. Each demodulator 354 may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators in transceivers 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the access point 110. At the AP 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the AP 110 and the UE 120, respectively. The processor 340 and/or other processors and modules at the AP 110 may perform or direct the execution of processes for the techniques described herein. The memories 342 and 382 may store data and program codes for AP 110 and UE 120, respectively. A scheduler 344 may schedule UEs for data transmission on the downlink and/or uplink.

Figure 4:
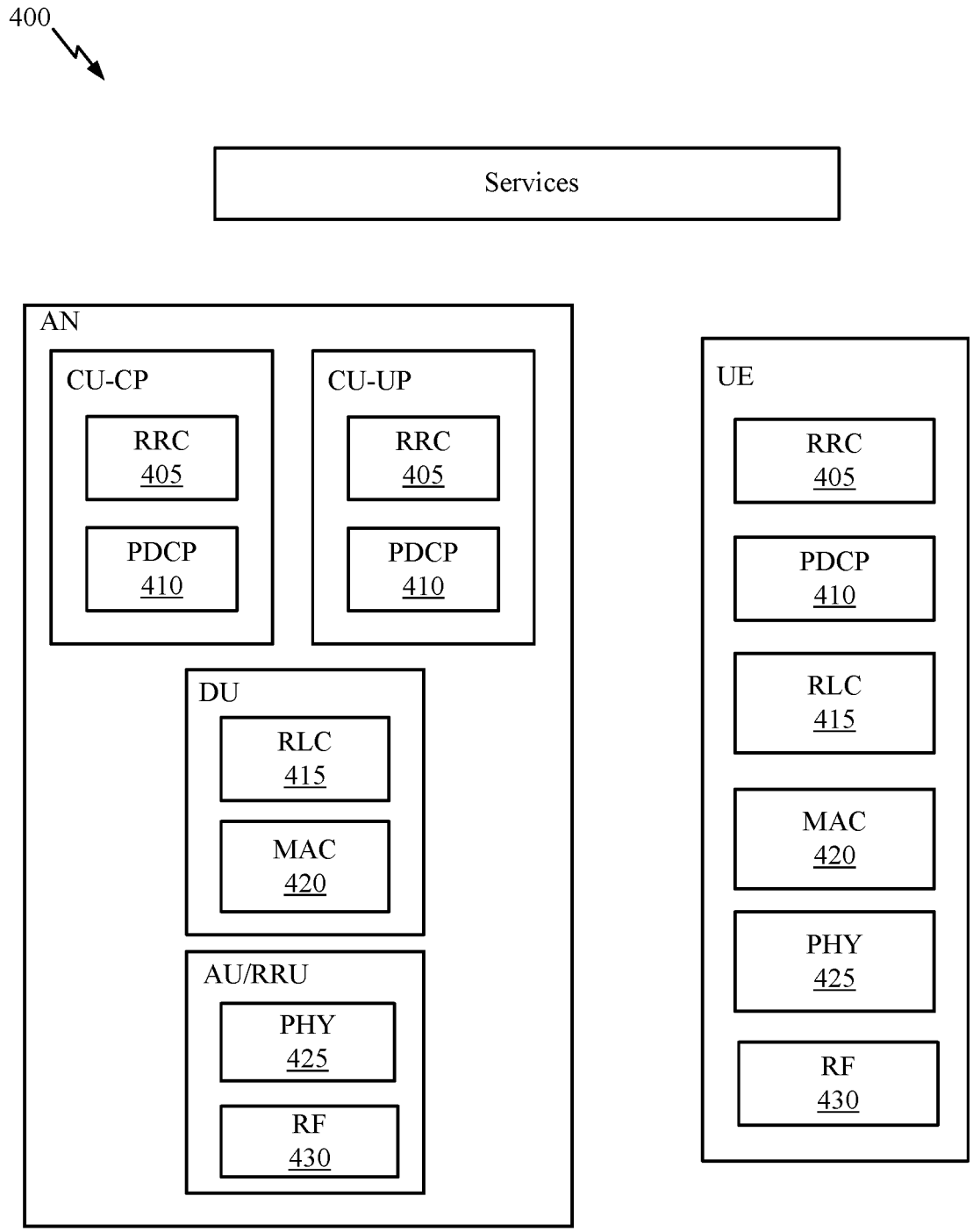
FIG. 4 is a block diagram illustrating an example communications protocol stack in a RAN, in accordance with certain aspects of the present disclosure.

FIG. 4 illustrates a diagram showing examples for implementing a communications protocol stack 400 in a RAN (e.g., such as the RAN 200), according to aspects of the present disclosure. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by an AN (e.g., AN 208 in FIG. 2, or AP 110a in FIG. 1) and/or the UE (e.g., UE 120).

As shown in FIG. 4, the protocol stack 400 is split in the AN. The RRC layer 405, PDCP layer 410, RLC layer 415, MAC layer 420, PHY layer 425, and RF layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222a-222c) may implement the entire protocol stack 400 (e.g., the RRC layer 405, the PDCP layer 410, the RLC layer 415, the MAC layer 420, the PHY layer(s) 425, and the RF layer(s) 430).

Figure 5:
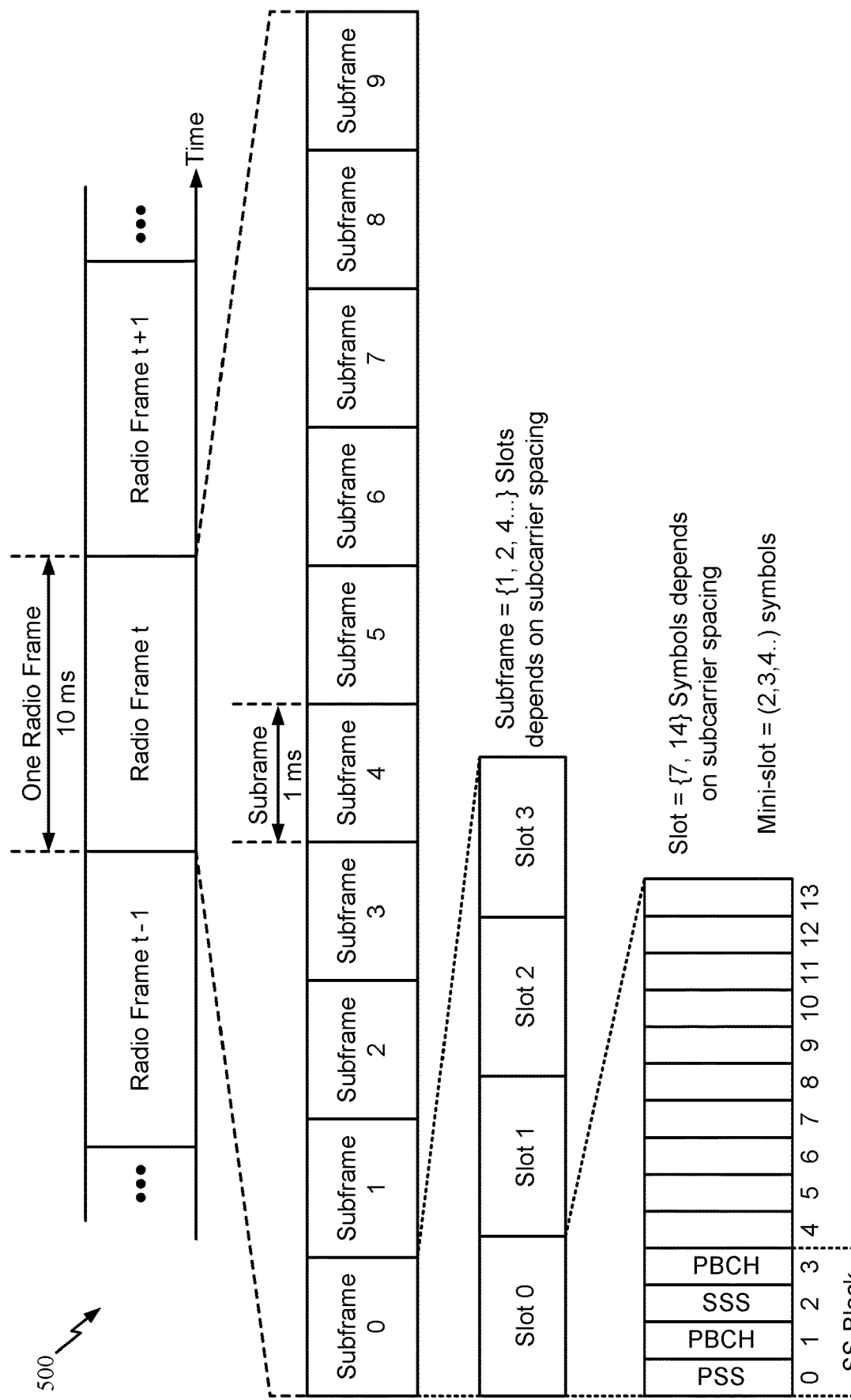
FIG. 5 is a block diagram is a diagram illustrating an example of a frame format for new radio (NR), in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or AP), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Directional Repeater

Next generation (e.g., 5G) wireless networks have stated objectives to provide ultra-high data rate and support a wider scope of application scenarios. Integrated access and backhaul (IAB) systems have been studied as one possible solution to help support these objectives.

As noted above, in IAB, a wireless backhaul solution may connect cells (IAB-nodes) to the core network (e.g., which may use a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions, and a particular architecture deployed may depend on what layers of protocol stack are implemented in the intermediate nodes (IAB-nodes). For example, L2 relays may implement PHY/MAC/RLC layers.

Certain aspects of the present disclosure relate to L1 relays (referred to as repeaters). L1 relays/repeaters have many attractive features. For example, such repeaters may be relatively simple, low-cost, low-power, and may be wirelessly connected to a donor or another relay (e.g., a gNB).

Figure 6:
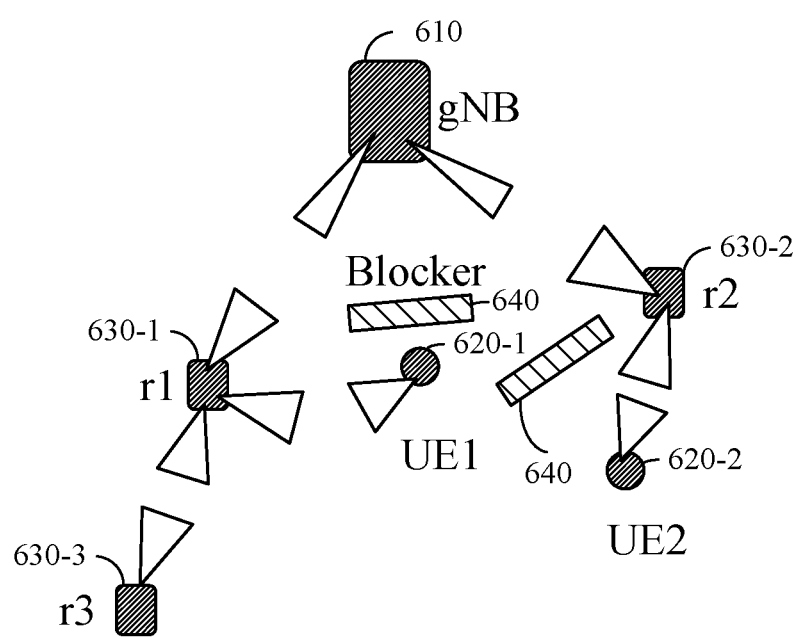
FIG. 6 is a block diagram of an example wireless system deploying repeaters, in which aspects of the present disclosure may be implemented.

FIG. 6 illustrates one example application of how repeaters may be used to help improve coverage by overcoming blockage (the obstruction of RF signals by an object). It is generally understood that blockage is a major issue in mmW (e.g., high frequencies) where beamforming is used to send directional signals. In the illustrated example, repeaters r1 630-1, r2 630-2, 630-3 may allow a gNB 610 to serve UE1 620-1 and UE2 620-2, even though objects may prevent at least some gNB 610 directional RF signals from reaching the UEs 620-1, 620-2.

As illustrated, because repeater 630-1 is not blocked, it may receive RF signals from the gNB 610 and re-transmit (e.g., forward) those signals to reach UE1 620-1 (although UE1 620-1 is blocked from receiving signals from gNB 610 directly). Similarly, because repeater r2 630-2 is not blocked, it may receive RF signals from gNB 610 and re-transmit (e.g., forward) the signals to reach UE2 620-2 (although UE2 620-2 is blocked from receiving signals from gNB 610 directly). Thus, L1 repeaters may serve as relatively simple and inexpensive solutions to provide protection against blockage, extend the coverage of a MMW cell, and fill coverage holes.

Figure 7A:
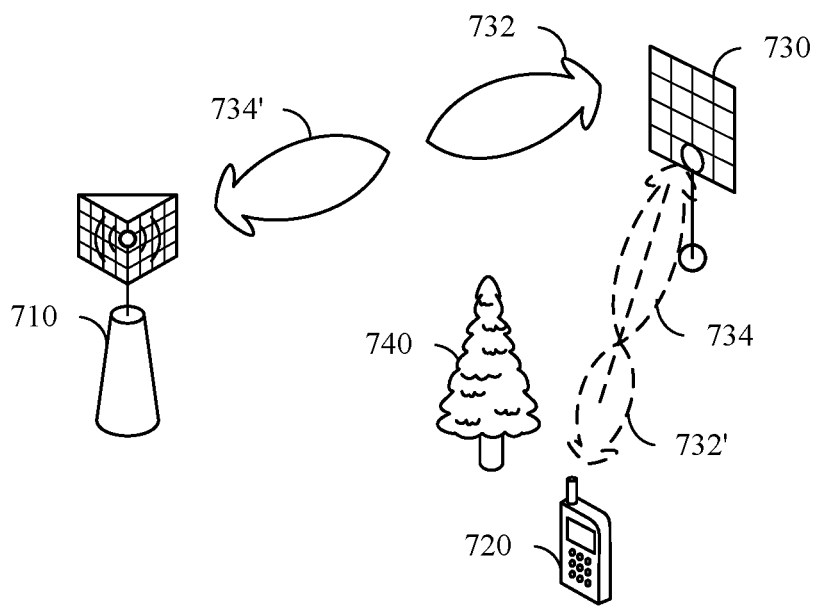
FIGS. 7A and 7B illustrate an example scenario, in which aspects of the present disclosure may be implemented.
Figure 7B:
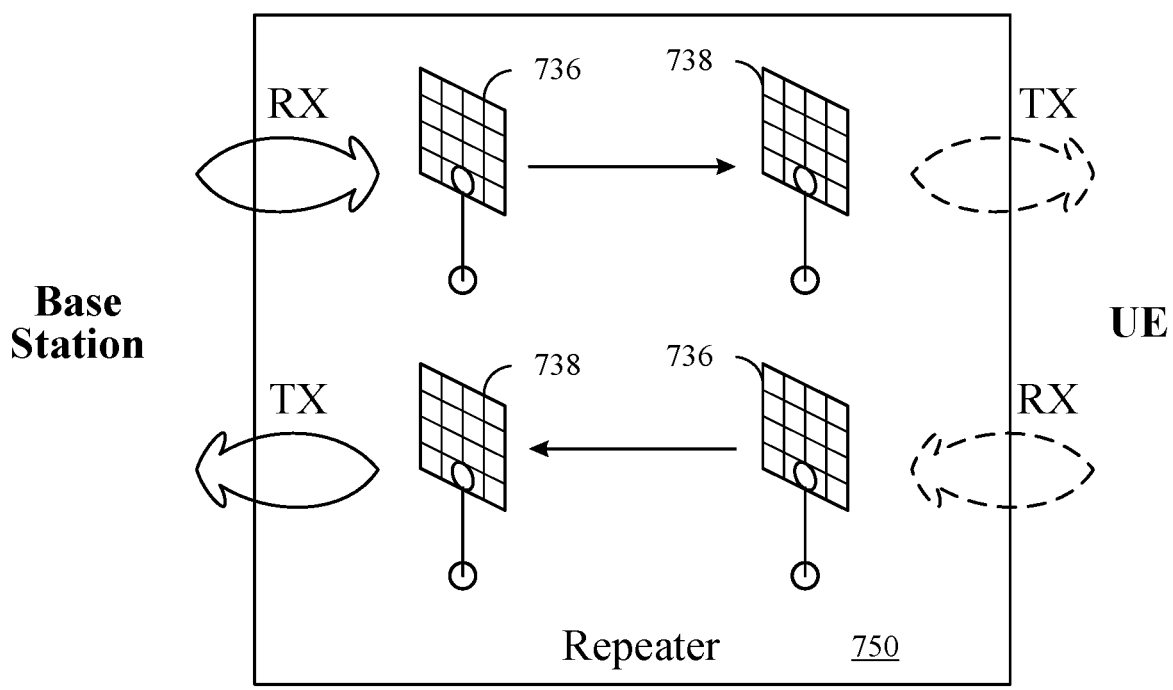

FIGS. 7A and 7B provide additional details of how repeaters may help overcome the challenge of blockage. As illustrated in FIG. 7A, a traditional repeater 730 may receive an RF signal 734 in one panel (corresponding to a receive or Rx Beam) and may (re-)transmit the signal 734' in another panel (corresponding to a transmit or Tx Beam). For example, the repeater 730 simply amplifies the received signal 734 and forwards it to become the transmitted signal 734' (e.g., amplify-and-forward).

In the example illustrated in FIG. 7A, the repeater r1 may be able to receive a RF (e.g., downlink) signal 732 from the base station 710 and relay that RF signal to a UE 720 that is blocked from receiving the RF signal 732' directly from the base station 710 directly. In the other (uplink) direction, the repeater r1 730 may receive an RF signal 732 from the base station 710 and relay that RF signal 732' to the UE 729. As illustrated in FIG. 7B, receive and transmit panels 736, 738 of a nonconventional repeater 750 may be used to implement some fixed beam patterns.

For wide coverage, the beam patterns are usually wide, and therefore may not achieve high array gains. The repeater may typically not be aware of whether the signal is downlink or uplink in a TDD system and operates in both directions (full duplex) simultaneously.

Figure 8:
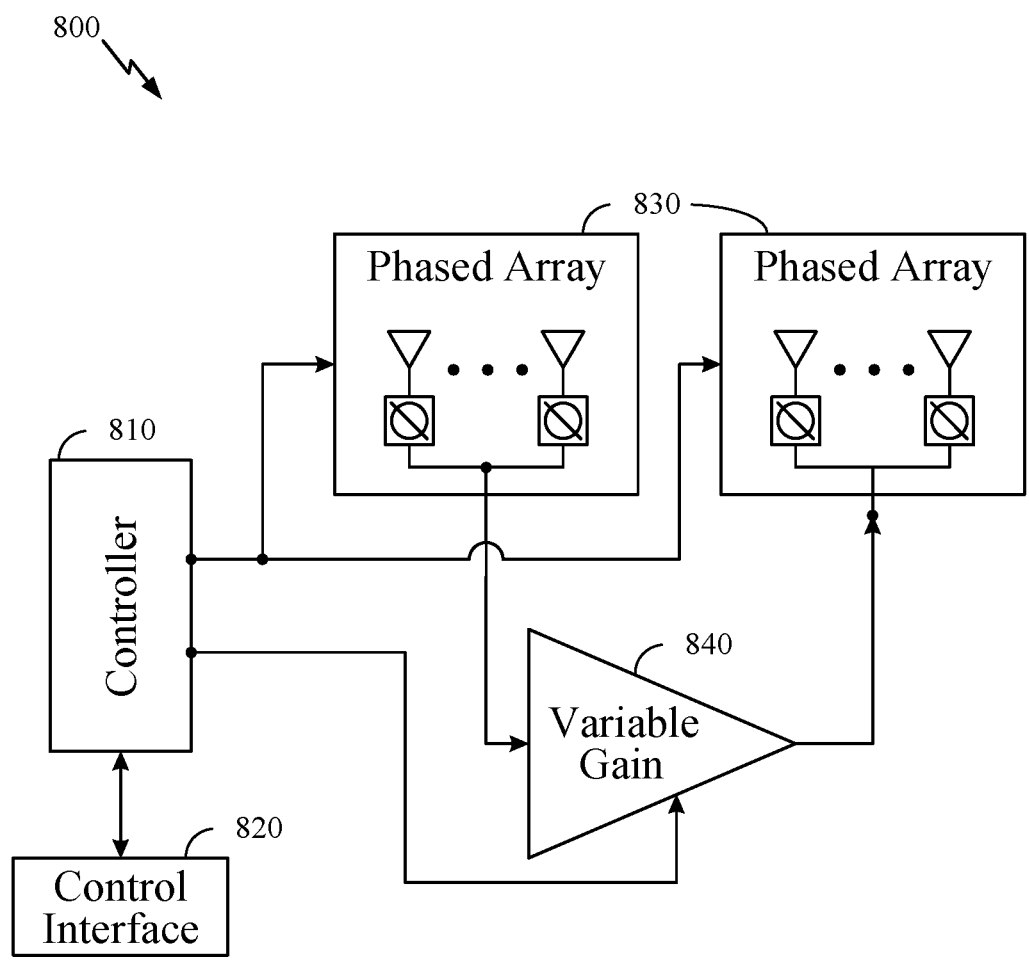
FIG. 8 is a block diagram of an example architecture for a directional repeater.

FIG. 8 illustrates a schematic view of an example architecture 800 for a repeater (e.g., an L1 repeater). As noted above, this type of repeater may generally perform basic operations of receiving an analog RF signal on its RX antennas (e.g., based on some configured RX beamforming), amplifying the power of the received analog RF signal, and transmitting the amplified signal from its TX antennas (e.g., based on some configured TX beamforming).

As illustrated, the beamforming may be accomplished via phased antenna arrays 830 configured by a controller 810, while the amplification may be accomplished by a variable gain amplifier 840. The repeater may also communicate some control signals with a server (e.g., a base station serving as a donor, control node, etc.) via a control interface 820. The control interface 820 may be implemented out-of-band (operating outside the carrier frequency on which the Rx signal is received) or in-band (e.g., using a smaller bandwidth part of the same carrier frequency). An out-of-band control interface 820 may be implemented, for example, via a separate (e.g. low-frequency) modem using a different radio technology (like BT) or different frequency (LTE NB-IoT).

Example Control Method for Smart Directional Repeaters

Aspects of the present disclosure may enhance the functionality of directional repeaters. In some cases, a wireless device (e.g., a network entity such as a gNB) may provide control information to a smart repeater using a narrowband portion, such as a bandwidth part (BWP) of a wider band used to send an RF signal to be relayed by the smart repeater. This control information may allow the network entity (or other type of wireless device) to control spatial resources (e.g., receive and/or transmit beams) at the repeater, which may allow for better coverage and potentially allow the support of more UEs than conventional repeater deployments.

Figure 9:
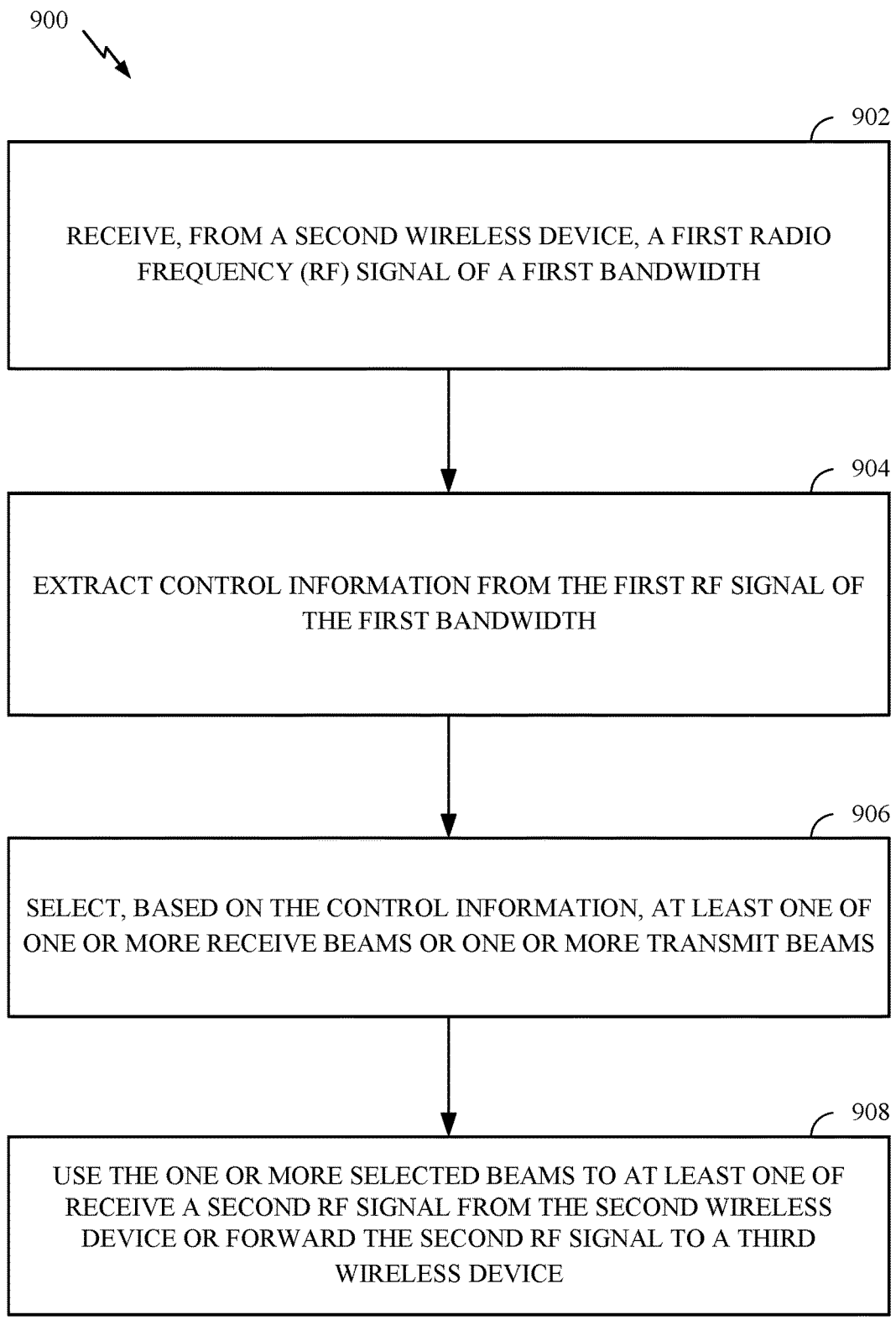
FIG. 9 illustrates example operations that may be performed by a directional repeater, in accordance with certain aspects of the present disclosure.

FIG. 9 illustrates example operations 900 for wireless communication by a first wireless device, in accordance with certain aspects of the present disclosure. The operations 900 may be performed, for example, by a repeater (e.g., the repeater 750 shown in FIG. 7B).

Operations 900 begin, at 902, by receiving, from a second wireless device, a first radio frequency (RF) signal of a first bandwidth. For example, the repeater may receive the first RF signal via a receive panel 736 (as shown in FIG. 7B).

At 904, the repeater extracts control information from the first RF signal of the first bandwidth. At 906, the repeater selects, based on the control information, at least one of one or more receive beams or one or more transmit beams. At 908, the repeater uses the one or more selected beams to at least one of receive a second RF signal from the second wireless device or forward (e.g., via the transmit panel 738) the second RF signal to a third wireless device.

Figure 10:
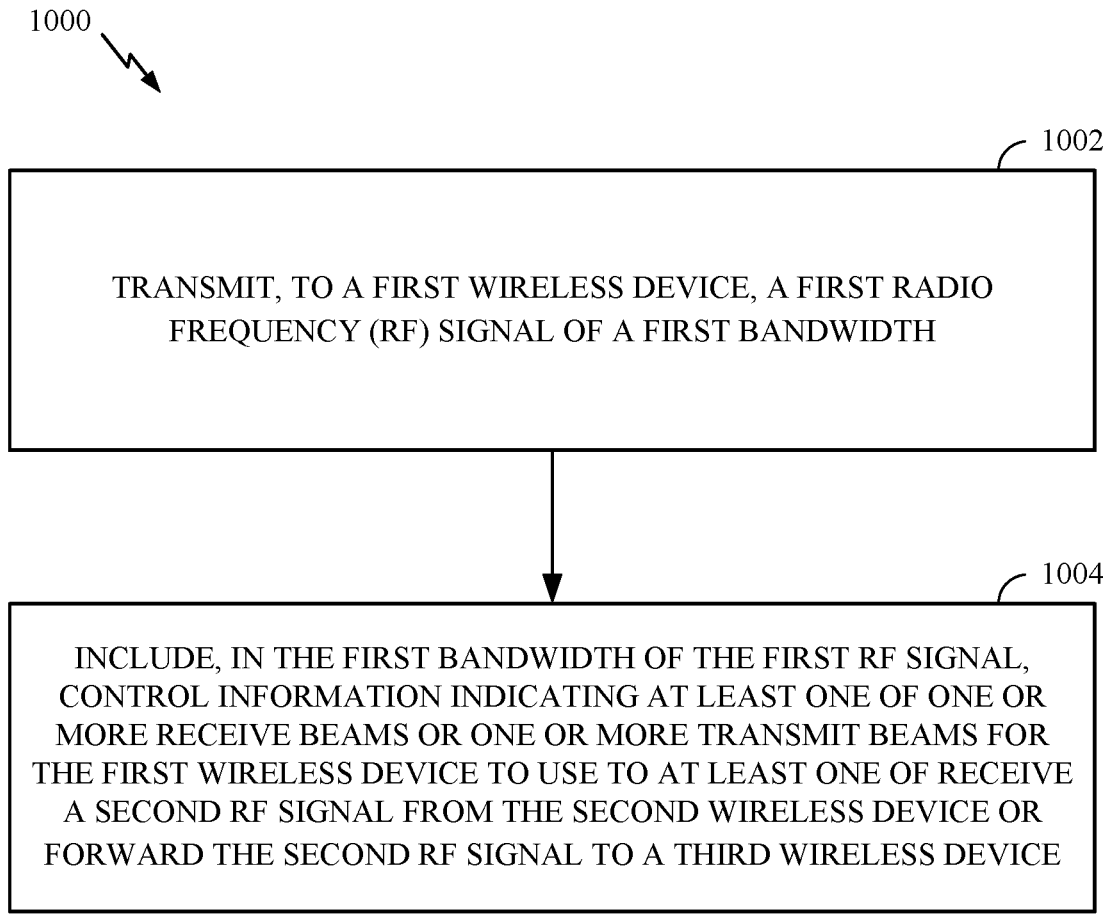
FIG. 10 illustrates example operations that may be performed by a network entity to configure a directional repeater, in accordance with certain aspects of the present disclosure.

FIG. 10 illustrates example operations 1000 for wireless communication by a second wireless device (e.g., a network entity), in accordance with certain aspects of the present disclosure. The operations 1000 may be performed, for example, by a base station (e.g., any of the base stations/gNBs shown in FIG. 1, 2, 6, 7A or 7B) to configure an enhanced repeater performing operations 900.

Operations 1000 begin, at 1002, by transmitting, to a first wireless device, a first radio frequency (RF) signal of a first bandwidth. At 1004, the network entity includes, in the first bandwidth of the first RF signal, control information indicating at least one of one or more receive beams or one or more transmit beams for the first wireless device to use to at least one of receive a second RF signal from the second wireless device or forward the second RF signal to a third wireless device.

Figure 11:
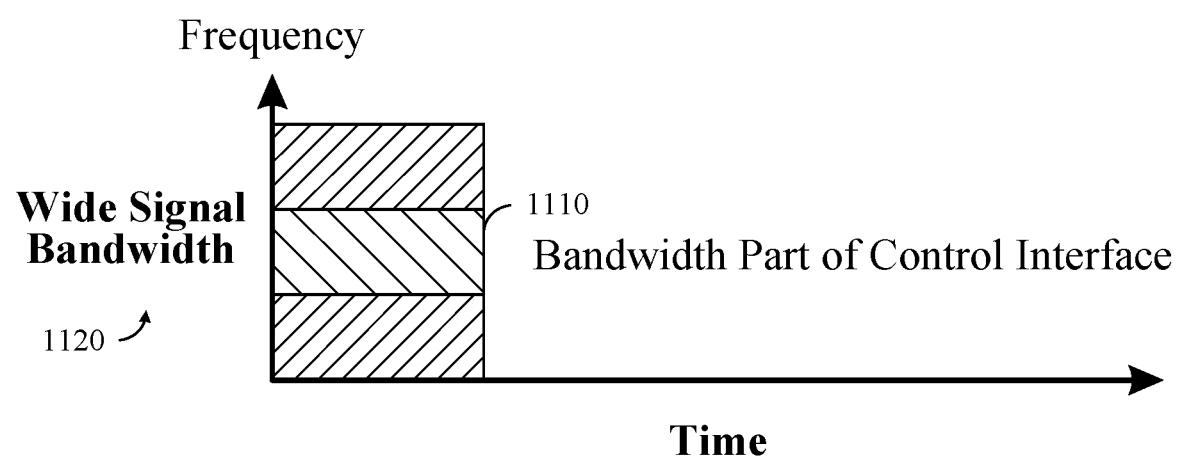
FIG. 11 illustrates example frequency resources for providing control information to a smart repeater, in accordance with certain aspects of the present disclosure.

FIG. 11 illustrates how in-band control information may be provided via a bandwidth part (BWP) 1110 within a wider signal bandwidth 1120. A base station (e.g., gNB) may use this in-band control signal to provide information to control the repeater.

For example, the repeater may have multiple narrow high-gain beams in both RX and TX directions. The base station may then use the in-band control information to select from the available beams.

In some cases, the repeater may be made aware of the time division (TDD) signal direction (downlink or uplink), so that at a given time the repeater either receives the signal from the base station and transmits it to a UE or receives the signal from the UE and transmits it to the base station. The signal passing direction may be controlled by the base station (and signaled to the repeater via the in-band control information).

Figure 12A:
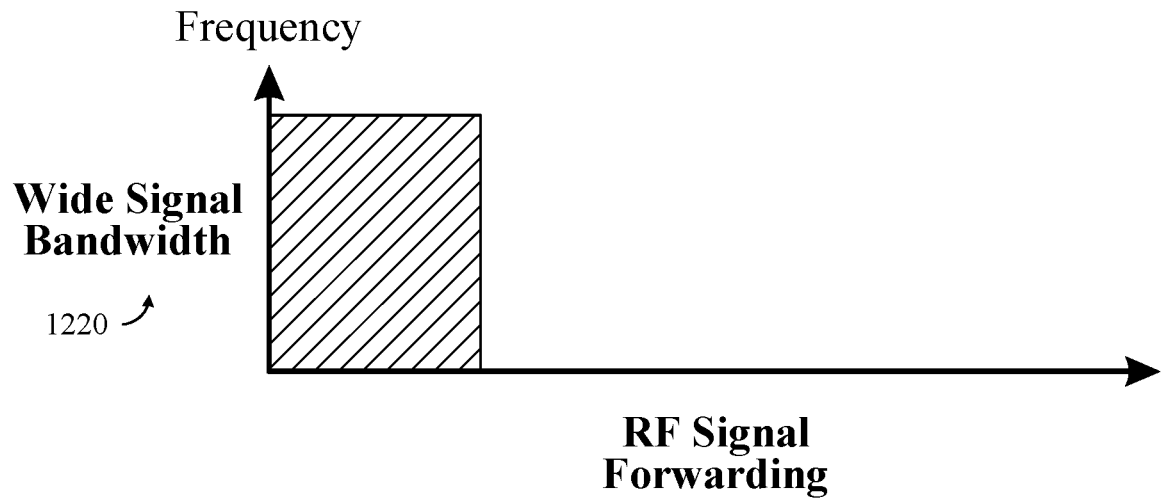
FIG. 12A illustrates example frequency resources for an RF signal relayed by a smart repeater, in accordance with certain aspects of the present disclosure.

FIG. 12A illustrates example frequency resources for an RF signal relayed by a smart repeater, in accordance with certain aspects of the present disclosure. In other words, the RF signal 1220 shown in FIG. 12A corresponds to the wideband portion of the signal shown in FIG. 11. As described above, the signal that the repeater passes through (e.g., using Amplify-and-Forward), between the base station and UE is a wideband signal.

Figure 12B:
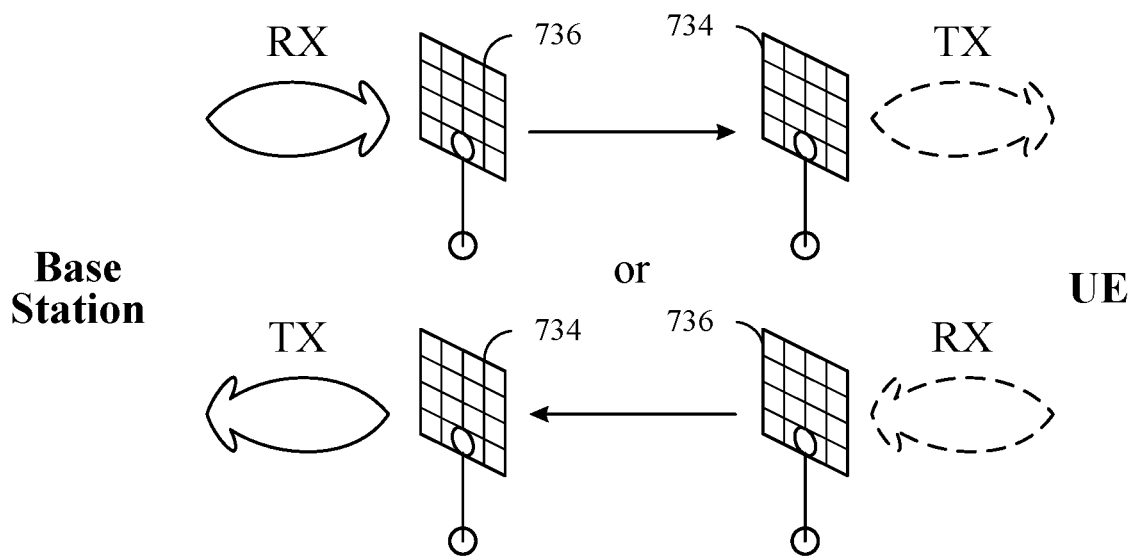
FIG. 12B illustrates how an analog signal received on the frequency resources shown in FIG. 12A may be relayed by a smart repeater, in accordance with certain aspects of the present disclosure.

As illustrated in FIG. 12B, the repeater uses an RX beam to receive the wideband RF signal, and preferably forwards the RF signal to a TX beam for transmission. As illustrated, at any given time, the repeater may either receive a wideband signal from the base station via an RX beam to be forwarded to the UE or another wireless device (e.g., a child repeater, which refers to another repeater that is located between a repeater and a UE or base station) via a TX beam or receive a wideband signal from the UE (or other wireless device) via an RX beam to be forwarded to the base station.

As described above, a conventional repeater typically may not convert the RF signal to baseband and digitize it (as a base station or UE would do for higher layer processing). Instead, the received signal may typically pass through various components of the repeater as an RF analog signal (although it may be possible to convert it to an IF signal in some of the components).

However, the received signal may contain control and data meant to be exchanged between the base station and UE, for example, as a BWP within the wider bandwidth as shown in FIG. 11.

Figure 13:
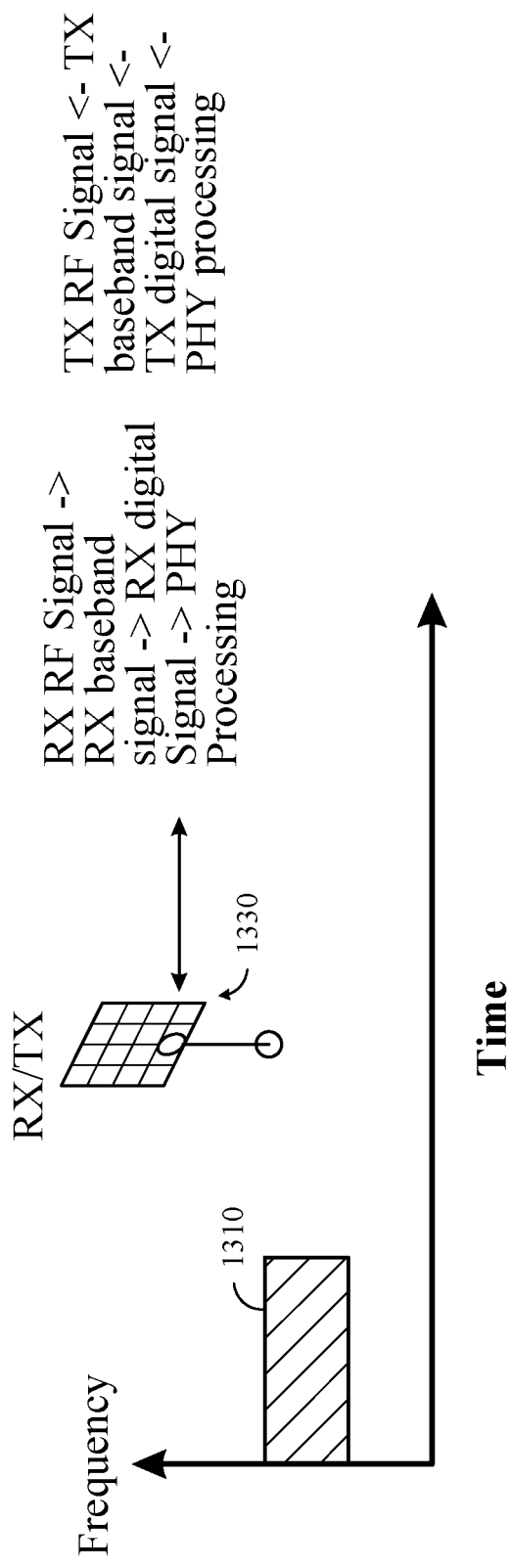
FIG. 13 illustrates how a smart repeater may extract control information from a narrowband portion of a wider RF signal, in accordance with certain aspects of the present disclosure.

FIG. 13 illustrates how a smart repeater may extract this control (and data) information from a narrowband portion of a wider RF signal, in accordance with certain aspects of the present disclosure. In other words, the RF signal shown in FIG. 13 may correspond to the narrowband portion of the signal shown in FIG. 11.

Thus, in addition to processing the wideband RF analog signal, the repeater may also extract the relatively narrowband signal, which may be located in a predetermined bandwidth part (BWP) of the wider signal bandwidth. In some cases, the repeater may monitor a BWP of a set of predetermined BWPs for the control information.

In some cases, the base station may inform the repeater of the frequency location of BWP. In such cases, the base station may change the location through the control interface (for the repeater to monitor for subsequent transmissions).

The repeater may digitally process the narrowband signal and retrieve (extracts) control (PHY) information from the base station. As noted above, the control information may be related to the selection of beams and may indicate DL/UL signal direction of the intended wideband RF analog signal. The control information may be exchanged (e.g., communicated) between the base station and repeater (and, thus, need not be forwarded on with the rest of wideband RF signal).

In some cases, the in-band control information may include other physical layer (PHY) control information, such as power control information, timing control information, power saving information (e.g., indicating when a repeater may power certain components down), and/or beam weights.

The repeater sets beam and signal direction according to the PHY information received on the control interface. For example, the repeater may select a receive beam indicate by the control information to use for receiving an RF signal to be relayed and/or may select a transmit beam used for relaying the RF signal.

Example Embodiments

Embodiment 1: A method for wireless communications by a first wireless device, comprising receiving, from a second wireless device, a first radio frequency (RF) signal of a first bandwidth, extracting control information from the first RF signal of the first bandwidth, selecting, based on the control information, at least one of one or more receive beams or one or more transmit beams, and using the one or more selected beams to at least one of receive a second RF signal from the second wireless device or forward the second RF signal to a third wireless device.

Embodiment 2: The method of Embodiment 1: wherein the second wireless device comprises a base station.

Embodiment 3: The method of Embodiment 1 or 2, wherein the control information is extracted from at least one bandwidth part (BWP) of the first bandwidth.

Embodiment 4: The method of Embodiment 3, further comprising receiving signaling indicating a location of the at least one BWP.

Embodiment 5: The method of any of Embodiments 3 or 4, further comprising receiving signaling indicating a change in location of the at least one BWP.

Embodiment 6: The method of any of Embodiments 3 to 5, wherein the first wireless device monitors a BWP of a set of predetermined BWPs for the control information.

Embodiment 7: The method of any of Embodiments 1 to 6, wherein the control information indicates at least one of power control, timing control, power saving, or beam weights for the first wireless device to use to at least one of receive the second RF signal from the second wireless device or forward the second RF signal to the third wireless device.

Embodiment 8: The method of any of Embodiments 1 to 7, wherein the first bandwidth comprises a millimeter-wave bandwidth.

Embodiment 9: A method for wireless communications by a second wireless device, comprising transmitting, to a first wireless device, a first radio frequency (RF) signal of a first bandwidth, and including, in the first bandwidth of the first RF signal, control information indicating at least one of one or more receive beams or one or more transmit beams for the first wireless device to use to at least one of receive a second RF signal from the second wireless device or forward the second RF signal to a third wireless device.

Embodiment 10: The method of Embodiment 9, wherein the second wireless device comprises a base station.

Embodiment 11: The method of Embodiment 9 or 10, wherein the control information is included in at least one bandwidth part (BWP) of the first bandwidth.

Embodiment 12: The method of Embodiment 11, further comprising transmitting signaling to the first wireless device indicating a location of the BWP.

Embodiment 13: The method of any of Embodiments 11 or 12, further comprising transmitting signaling to the first wireless device indicating a change in location of the BWP.

Embodiment 14: The method of any of Embodiments 11 to 13, wherein the second wireless device sends the control information on a BWP of a set of predetermined BWPs.

Embodiment 15: The method of any of Embodiments 9 to 14, wherein the control information indicates at least one of power control, timing control, power saving, or beam weights for the first wireless device to use to at least one of receive the second RF signal from the second wireless device or forward the second RF signal to the third wireless device.

Embodiment 16: An apparatus for wireless communications, comprising at least one processor and a memory configured to receive, from a second wireless device, a first radio frequency (RF) signal of a first bandwidth, extract control information from the first RF signal of the first bandwidth, select, based on the control information, at least one of one or more receive beams or one or more transmit beams, and use the one or more selected beams to at least one of receive a second RF signal from the second wireless device or forward the second RF signal to a third wireless device.

Embodiment 17: The apparatus of Embodiment 16, wherein the second wireless device comprises a base station.

Embodiment 18: The apparatus of Embodiment 16 or 17, wherein the control information is extracted from at least one bandwidth part (BWP) of the first bandwidth.

Embodiment 19: The apparatus of Embodiment 18, wherein the at least one processor and the memory are further configured to receive signaling indicating a location of the at least one BWP.

Embodiment 20: The apparatus of any of Embodiments 18 or 19, wherein the at least one processor and the memory are further configured to receive signaling indicating a change in location of the at least one BWP.

Embodiment 21: The apparatus of any of Embodiments 18 to 20, wherein the first wireless device monitors a BWP of a set of predetermined BWPs for the control information.

Embodiment 22: The apparatus of any of Embodiments 16 to 21, wherein the control information indicates at least one of power control, timing control, power saving, or beam weights for the first wireless device to use to at least one of receive the second RF signal from the second wireless device or forward the second RF signal to the third wireless device.

Embodiment 23: The apparatus of any of Embodiments 16 to 22, wherein the first bandwidth comprises a millimeter-wave bandwidth.

Embodiment 24: An apparatus for wireless communications by a second wireless device, comprising at least one processor and a memory configured to transmit, to a first wireless device, a first radio frequency (RF) signal of a first bandwidth, and include, in the first bandwidth of the first RF signal, control information indicating at least one of one or more receive beams or one or more transmit beams for the first wireless device to use to at least one of receive a second RF signal from the second wireless device or forward the second RF signal to a third wireless device.

Embodiment 25: The apparatus of Embodiment 24, wherein the second wireless device comprises a base station.

Embodiment 26: The apparatus of Embodiment 24 or 25, wherein the control information is included in at least one bandwidth part (BWP) of the first bandwidth.

Embodiment 27: The apparatus of Embodiment 26, wherein the at least one processor and the memory are further configured to transmit signaling to the first wireless device indicating a location of the BWP.

Embodiment 28: The apparatus of any of Embodiments 26 or 27, wherein the at least one processor and the memory are further configured to transmit signaling to the first wireless device indicating a change in location of the BWP.

Embodiment 29: The apparatus of any of Embodiments 26 to 28, wherein the apparatus sends the control information on a BWP of a set of predetermined BWPs.

Embodiment 30: The apparatus of any of Embodiments 24 to 29, wherein the control information indicates at least one of power control, timing control, power saving, or beam weights for the first wireless device to use to at least one of receive the second RF signal from the second wireless device or forward the second RF signal to the third wireless device.

Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 338) or an antenna(s) 334 of the access point 110 or the receive processor 358 or antenna(s) 352 of the station 120 illustrated in FIG. 3. Means for transmitting or means for outputting may include a transmitter (such as the transmit processor 320) or an antenna(s) 334 of the access point 110 or the transmit processor 364 or antenna(s) 352 of the station 120 illustrated in FIG. 3. Means for associating, means for determining, means for monitoring, means for deciding, means for providing, means for detecting, means for performing, and/or means for setting may include a processing system, which may include one or more processors, such as the receive processor 338/358, the transmit processor 320/364, the TX MIMO processor 330/366, or the controller 340/380 of the access point 110 and station 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first wireless device comprising a repeater, comprising:
   receiving, from a second wireless device, a first radio frequency (RF) signal of a first bandwidth for forwarding to a user equipment (UE), wherein the first bandwidth comprises a first bandwidth part (BWP);
   extracting control information from the first BWP of the first RF signal, wherein the control information indicates beam weights for the first wireless device to use to at least one of receive a second RF signal from the second wireless device or forward the first RF signal to the UE;
   amplifying and forwarding the first RF signal without extracting information from the first bandwidth that does not include the first BWP;
   selecting, based on the control information, at least one of: one or more receive beams or one or more transmit beams;
   selecting, based on the control information, a signal direction for the one or more receive beams or the one or more transmit beams; and
   using the one or more selected beams to at least one of: receive the second RF signal from the second wireless device or forward the first RF signal to the UE.

2. The method of claim 1, wherein the second wireless device comprises a base station.

3. The method of claim 1, further comprising receiving signaling indicating a location of the at least one BWP.

4. The method of claim 1, further comprising receiving signaling indicating a change in a location of the at least one BWP.

5. The method of claim 1, further comprising monitoring a BWP of a set of predetermined BWPs for the control information.

6. The method of claim 1, wherein the first bandwidth comprises a millimeter-wave bandwidth.

7. An apparatus for wireless communications by a first wireless device comprising a repeater, comprising:
   a memory comprising instructions; and
   one or more processors configured, individually or in any combination, to execute the instructions and cause the apparatus to:
      receive, from a second wireless device, a first radio frequency (RF) signal of a first bandwidth for forwarding to a user equipment (UE), wherein the first bandwidth comprises a first bandwidth part (BWP);
      extract control information from the first BWP of the first RF signal, wherein the control information indicates beam weights for the first wireless device to use to at least one of receive a second RF signal from the second wireless device or forward the first RF signal to the UE;
      amplify and forward the first RF signal without extracting information from the first bandwidth that does not include the first BWP;
      select, based on the control information, at least one of: one or more receive beams or one or more transmit beams;
      select, based on the control information, a signal direction for the one or more receive beams or the one or more transmit beams; and
      use the one or more selected beams to at least one of: receive the second RF signal from the second wireless device or forward the first RF signal to the UE.

8. The apparatus of claim 7, wherein the second wireless device comprises a base station.

9. The apparatus of claim 7, wherein the one or more processors are configured, individually or in any combination, to execute the instructions and cause the apparatus to receive signaling indicating a location of the at least one BWP.

10. The apparatus of claim 7, wherein the one or more processors are configured, individually or in any combination, to execute the instructions and cause the apparatus to receive signaling indicating a change in a location of the at least one BWP.

11. The apparatus of claim 7, wherein the one or more processors are configured, individually or in any combination, to execute the instructions and cause the apparatus to monitor a BWP of a set of predetermined BWPs for the control information.

12. The apparatus of claim 7, wherein the first bandwidth comprises a millimeter-wave bandwidth.

* * * * *